United States Patent
Choi et al.

(10) Patent No.: US 7,529,105 B1
(45) Date of Patent: May 5, 2009

(54) CONFIGURING A POWER CONVERTER TO OPERATE WITH OR WITHOUT BURST MODE FUNCTIONALITY

(75) Inventors: Jin Ho Choi, Lewisville, TX (US); Richard Chang-Wei Chung, Austin, TX (US); Kevin Parmenter, Tempe, AZ (US)

(73) Assignee: Fairchild Semiconductor Corporation, South Portland, ME (US)

( * ) Notice: Subject to any disclaimer, the term of this patent is extended or adjusted under 35 U.S.C. 154(b) by 211 days.

(21) Appl. No.: 11/592,372

(22) Filed: Nov. 3, 2006

(51) Int. Cl.
*H02M 3/335* (2006.01)

(52) U.S. Cl. .................. 363/21.12; 363/21.18; 363/97; 363/131

(58) Field of Classification Search ............. 363/21.12, 363/21.13, 21.15, 21.16, 21.17, 21.18, 97, 363/56.09, 131
See application file for complete search history.

(56) References Cited

U.S. PATENT DOCUMENTS

| | | | | | |
|---|---|---|---|---|---|
| 5,812,383 | A | * | 9/1998 | Majid et al. | 363/21.05 |
| 5,956,242 | A | * | 9/1999 | Majid et al. | 363/21.16 |
| 5,982,640 | A | * | 11/1999 | Naveed et al. | 363/21.15 |
| 5,986,897 | A | * | 11/1999 | Majid et al. | 363/21.16 |
| 5,995,384 | A | * | 11/1999 | Majid et al. | 363/21.18 |
| 6,252,783 | B1 | * | 6/2001 | Huh et al. | 363/21.01 |
| 6,392,906 | B2 | * | 5/2002 | L'Hermite et al. | 363/97 |
| 6,646,894 | B2 | * | 11/2003 | Hong et al. | 363/21.01 |
| 7,064,968 | B2 | * | 6/2006 | Choi et al. | 363/97 |
| 7,079,404 | B2 | * | 7/2006 | Hong et al. | 363/21.01 |
| 7,136,292 | B1 | * | 11/2006 | Chan et al. | 363/21.09 |
| 7,218,532 | B2 | * | 5/2007 | Choi et al. | 363/21.01 |
| 7,345,894 | B2 | * | 3/2008 | Sawtell et al. | 363/21.11 |
| 2005/0270808 | A1 | * | 12/2005 | Choi et al. | 363/21.01 |

* cited by examiner

*Primary Examiner*—Bao Q Vu
(74) *Attorney, Agent, or Firm*—Sidley Austin LLP (57) ABSTRACT

In one embodiment, a method is provided for a power converter system. The method includes: automatically configuring the power converter system to operate with burst mode functionality if a control module of the power converter system is coupled in a first arrangement; and automatically configuring the power converter system to operate without burst mode functionality if the control module of the power converter system is coupled in a second arrangement.

16 Claims, 6 Drawing Sheets

FIG. 6

CONFIGURING A POWER CONVERTER TO OPERATE WITH OR WITHOUT BURST MODE FUNCTIONALITY

TECHNICAL FIELD OF INVENTION

The present invention relates to power converters, and more particularly, to configuring a power converter to operate with or without burst mode functionality.

BACKGROUND

Power converters are essential for many modern electronic devices. Among other capabilities, a power converter can adjust voltage level downward (buck converter) or adjust voltage level upward (boost converter). A power converter may also convert from alternating current (AC) power to direct current (DC) power, or vice versa. Power converters are typically implemented using one or more switching devices, such as transistors, which are turned on and off to deliver or supply power to the output of the converter. Such a power converter may be incorporated into or used to implement a power supply—i.e., a switching mode power supply (SMPS).

In some applications, it is desirable for a SMPS to be capable of burst mode operation. This is common for battery-powered electronic devices (such as portable cellular telephones, laptop computers, etc.) that have a normal operating mode, in which the devices consume a relatively large amount of power, and a standby operating mode (e.g., a sleep mode), in which the devices consume relatively little power. In the normal operating mode, the switching device of the SMPS is switched on and off continuously at a predetermined frequency. In the standby operating mode, the switching device is switched on and off in bursts having a predetermined frequency. The electronic devices will automatically enter the standby operating mode when a user has not interacted with the device for a predetermined amount of time, thereby conserving battery power. The electronic devices will automatically exit the standby operating mode and enter the normal operating mode when a user interacts in some way with the device, for example, by pushing a control button, mouse, etc.

In other applications, however, such as audio power, modems, PABX, and other telecommunication, etc., burst mode operation is not desirable because it generates audible noise and high ripple voltage. Microcontrollers in modems are very sensitive to ripple voltage. Power supplies operating in burst mode operation can make these microcontrollers malfunction.

From the perspective of a manufacturer of power converter parts, it is undesirable to produce two different parts in which the only difference between the parts is the presence or absence of burst mode functionality. Also, from the perspective of a manufacturer of a variety electronic devices, it is desirable to be able to use the same part in many different kinds of products—e.g., television sets, DVD players, computers, handheld telephones, modems, PABX devices, etc. This simplifies ordering and inventory management.

SUMMARY

According to an embodiment of the present invention, a method is provided for a power converter system. The method includes: automatically configuring the power converter system to operate with burst mode functionality if a control module of the power converter system is coupled in a first arrangement; and automatically configuring the power converter system to operate without burst mode functionality if the control module of the power converter system is coupled in a second arrangement.

According to another embodiment of the present invention, a control module is provided for automatically configuring a power converter system to operate with or without burst mode functionality. The control module includes a configuration terminal. Circuitry automatically configures the power converter system to operate with burst mode functionality if the configuration terminal is coupled in a first arrangement in the power converter system and automatically configures the power converter system to operate without burst mode functionality if the configuration terminal is coupled in a second arrangement in the power converter system.

According to yet another embodiment of the present invention, a power converter system includes an input terminal for receiving an AC input voltage. A rectifier, coupled to the input terminal, rectifies the AC input voltage to provide a DC line voltage. A transformer, coupled to the rectifier, has a primary winding and a secondary winding. A switching device is coupled to the primary winding of the transformer and is operable to be turned on and off to cause current to flow through the primary winding. An output terminal is coupled to secondary winding of the transformer. Power is delivered to a load of the power converter system at the output terminal. A control module is coupled to the switching device for controlling the switching device. The control module automatically configures the power converter system to operate with burst mode functionality if the control module is connected in a first arrangement in the power converter system. The control module further automatically configures the power converter system to operate without burst mode functionality if the control module is connected in a second arrangement in the power converter system.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1 through 6 of the drawings. Like numerals are used for like and corresponding parts of the various drawings.

According to embodiments of the present invention, a power converter system can be configured to operate with or without burst mode functionality. Such power converter system is useful because it can be incorporated into both electronic devices in which burst mode functionality is desirable and those in which burst mode functionality is not desirable.

Figure 1:
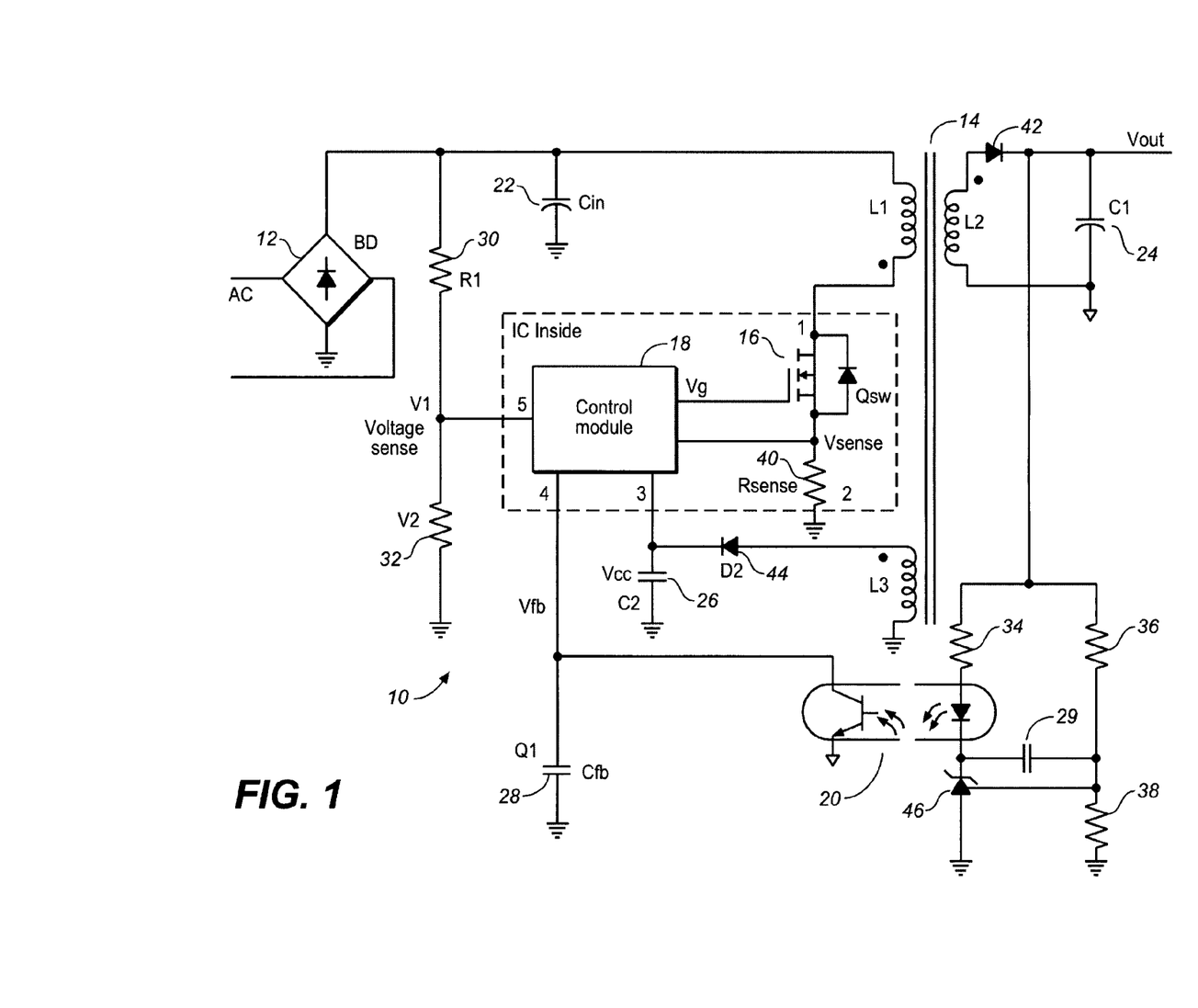
FIG. 1 is a schematic diagram of an exemplary implementation of a power converter system which can be configured to operate with or without burst mode functionality, according to an embodiment of the invention.

FIG. 1 is a schematic diagram of an exemplary implementation of a power converter system 10 which can be configured to operate with or without burst mode functionality, according to an embodiment of the invention. Power converter system 10 is a converter which can be incorporated in or used with an electronic device, such as, for example, a notebook computer, a cellphone, a PABX, a modem, or any other suitable electronic device. In electronic devices for which power consumption or efficiency is a concern (such as portable devices), the power converter system 10 can automatically configure to operate with burst mode functionality. In other electronic devices in which burst mode operation is undesirable (such as modems), the power converter system 10 can automatically configure to operate without burst mode functionality. In this embodiment, power converter system 10 is an AC-to-DC converter. Power converter system 10 receives an input AC mains voltage and provides DC power to a load at an output terminal Vout.

As shown, the power converter system 10 includes a rectifier 12, a transformer 14, a switching device 16, a control module 18, optocoupler 20, capacitors 22, 24, 26, 28, 29, resistors 30, 32, 34, 36, 38, 40, and diodes 42, 44, and 46. In various embodiments, all or a portion of power converter system 10 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween. In one embodiment, for example, switching device 16, control module 18, and resistor 40 can be provided on a single chip or die, and remaining elements implemented as discrete components or on one or more separate die.

The rectifier 12 rectifies the incoming AC mains voltage to create a DC line voltage, which is filtered by capacitor 22. The transformer 14 includes a primary winding L1 connected to the DC power at one end and the switching device 16 at the other end. As used herein, the terms or "connected" or "coupled," or any variant thereof, covers any connection or coupling, either direct or indirect, between two or more elements. The transformer 14 and the switching device 16 implement a flyback generator. The switching (i.e., turning on and off) of the switch device 16 causes energy to be stored in the primary winding L1 and transferred to a secondary winding L2 of the transformer 14. Current flows from the secondary winding L2 to the diode 42 and capacitor 24. The diode 42 rectifies the current pulses provided by the secondary winding L2 and the capacitor 24 filters and smooths the rectified current pulses to form a substantially direct current output voltage Vout at the output terminal. The ratio of turns in the windings L1 and L2 of transformer 14 may be adjusted to either increase or decrease the voltage associated with the AC mains power source and the output voltage (Vout) as needed for a particular application. Switching device 16 can be implemented with any suitable device, such as, for example, a metal-oxide-semiconductor field effect transistor (MOSFET), an IGBT, a MOS-gated thyristor, or other suitable power device. In one embodiment, switching device 16 is implemented as a senseFET. Switching device 16 has a gate to which driving voltage may be applied to turn the switching device on or off.

Optocoupler 20, resistors 34, 36, 38, capacitors 28, 29, and diode 46 implement a feedback network. This feedback network provides a feedback signal (Vfb) which corresponds to or is indicative of the output of the power converter system 10.

Control module 18 is connected to the gate of switching device 16 and provides a control signal (Vg) for turning on and off switching device 16. Control module 18 has an input for receiving a signal which is indicative of the current flowing through the switching device 16. This signal is developed by resistor 40, which functions as a sensing resistor. Voltage across resistor 40 is sensed and compared to the feedback signal Vfb to control switching device 16 for output voltage regulation. In one embodiment, resistor 40 may be incorporated in the switching device 16 as the sensing resistor of a senseFET. Control module 18 also has an input (e.g., pin 4) for receiving the feedback signal (Vfb) from the feedback network. Supply voltage or power (Vcc) is provided for control module 18 by a network comprising a winding L3, diode 44, and capacitor 26. In addition, control module 18 also has an input (e.g., pin 5) which can be used for configuring power converter system 10 to operate with or without burst mode functionality, as described in more detail herein.

This configuration input terminal receives a voltage sense signal. If, as shown, the configuration input terminal is coupled at the common node of resistors 30, 32 (with resistors 30 and 32 coupled in series between the rectified (line) voltage and ground), then control module 18 will automatically configure system 10 to operate with burst mode functionality. Resistor 30 develops a voltage sense signal which corresponds to or is indicative of the line voltage. That is, resistors 30 and 32 form a voltage divider circuit which divides the line voltage. Alternately, if the resistor 30 is not provided in power converter system 10, and the configuration input terminal is simply connected to ground through resistor 32, then control module 18 will automatically configure power converter system 10 to operate without burst mode functionality. Other techniques for developing the voltage sense signal are possible, and would be understood to one of ordinary skill.

With power converter system 10, if the burst mode functionality is enabled, then control module 18 will provide for burst mode operation. On the other hand, if the burst mode functionality is disabled, then control module 18 will not provide for burst mode operation in the system. As such, power converter system 10 is useful because it can be incorporated into both electronic devices in which burst mode functionality is desirable (e.g., portable cellular telephones, laptop computers, etc.) and those in which burst mode functionality is not desirable (e.g., audio power, modems, PABX, and other telecommunication, etc.). Thus, power converter system 10 is versatile.

Figure 2:
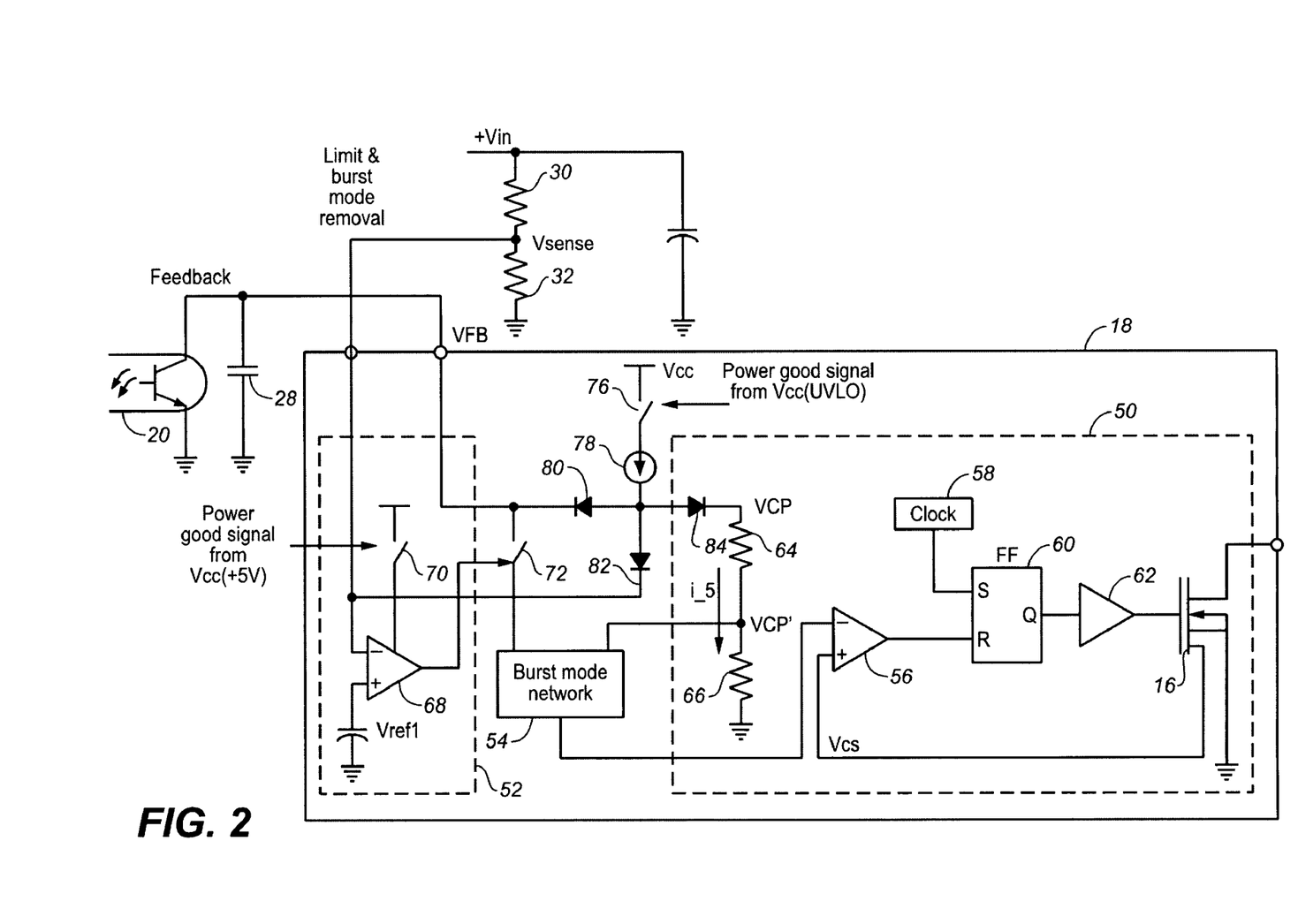
FIG. 2 is a schematic diagram in partial block form of an implementation of a control module for the power converter system, according to an embodiment of the invention.

FIG. 2 is a schematic diagram in partial block form of an implementation of a control module 18 for the power converter system 10, according to an embodiment of the invention. Control module 18 generally functions to provide control signals for turning on and off switching device 16, which can be implemented as a senseFET. In one embodiment, control module 18 and switching device 16 can be implemented on the same integrated circuit (IC) or semiconductor die. As depicted, control module 18 includes a pulse width modulation (PWM) network 50, a burst mode rejection network 52, a burst mode network 54, a switch 76, a current source 78, and diodes 80, 82, 84.

PWM network 50 functions to provide a PWM signal for driving the switching device 16. Pulse width modulation (PWM) is a technique which is commonly employed to vary the width of the pulse in a periodic signal for turning on and off the switching devices in a power converter. With PWM, the frequency is held constant and the width of each pulse is varied to form a fixed-frequency, variable-duty cycle operation. PWM network 50 may comprise PWM comparator 56, a clock circuit 58, a latch circuit 60, and a driver circuit 62. PWM comparator 56 is coupled to switching device 16 to receive a signal therefrom. This signal may be used as a reference voltage (Vref2) for controlling the driving of the switching device 16. PWM comparator 56 compares a Burst signal from the burst mode network 54 against the reference voltage signal Vref2 and, in response, outputs a signal to the latch circuit 60. The latch circuit 60, as shown, can be implemented as a set-reset (SR) flip-flop. The set input of the latch circuit 24 receives a clock signal from clock circuit 58, and the reset input receives the output from the error amplifier 56. The output (Q) of the latch circuit 60 is provided to driver circuit 62 to drive the switching device 16.

Burst mode rejection network 52 generally functions to enable or disable burst mode operation in power converter system 10. Burst mode rejection network 52 receives the voltage sense signal at the configuration input terminal (e.g., pin 5). In one embodiment, as shown, burst mode rejection network 52 comprises a comparator 68 and a switch 70. Switch 70 functions to enable the comparator 68. If the power supply voltage Vcc for control module 18 exceeds a threshold (e.g., 5V), then switch 70 is turned on to enable the comparator 68. The comparator 68 compares the Vsense signal (developed at the configuration input terminal (pin 5)) against a reference voltage Vref1, and generates an output signal in response. If resistor 30 is present in power converter system 10 (coupled between the line voltage and the configuration input), burst mode rejection network 52 outputs a signal which disables the burst mode operation in power converter system 10, thereby configuring system 10 to operate without burst mode functionality. On the other hand, if resistor 30 is absent from power converter system 10, then the system is configured to operate with burst mode functionality. In this case, power converter system 10 can alternatingly operate in burst mode or normal mode. Here, burst mode rejection network 52 will enable burst mode operation if the supply voltage Vcc is below an undervoltage lockout (UVLO) value, such as, 12V. Burst mode rejection network 52 will disable burst mode operation (thus providing for normal mode of operation) if the supply voltage Vcc is above the UVLO value.

Burst mode network 54 generally functions to provide burst mode functionality in control module 18. Burst mode network 54 receives a control signal VCP', which is developed by a resistor network comprising resistors 64 and 66 in PWM network 50. Burst mode network 54 is enabled or disabled by a signal from the burst mode rejection network 52. In particular, the output signal from burst mode rejection network 52 controls a switch 72. If the switch 72 is closed, burst mode functionality is enabled for control module 18. With burst mode functionality enabled, power converter system 10 can alternatingly operate in burst mode or normal mode depending on, for example, whether supply voltage Vcc is above or below UVLO value. Otherwise, if the switch 72 is open, burst mode functionality is disabled. If burst mode functionality is disabled, power converter system 10 is not able to operate in burst mode at all. An exemplary implementation for burst mode network 54 is shown in described with reference to FIG. 3.

Figure 3:
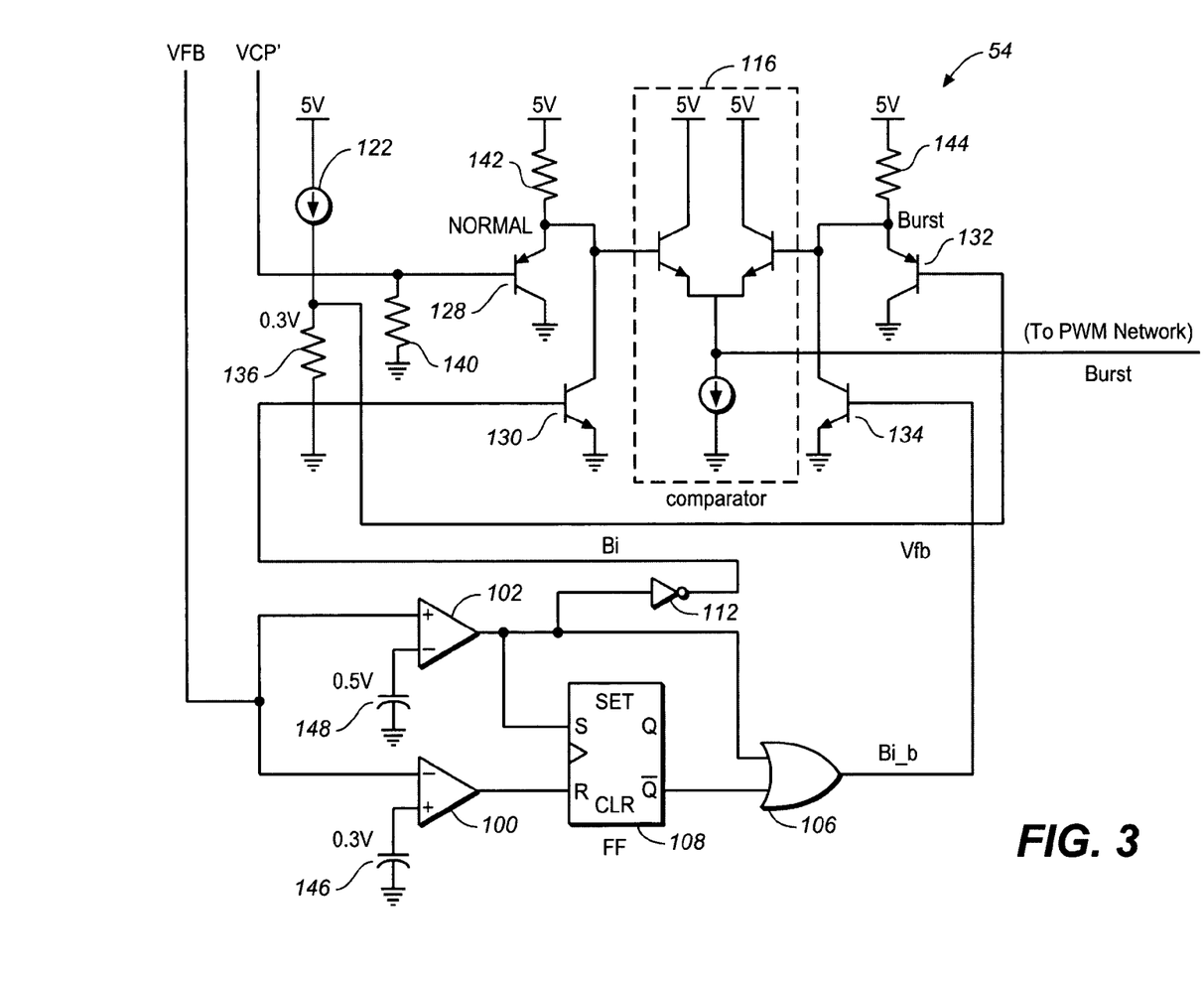
FIG. 3 is a schematic diagrams of an exemplary implementation of a burst mode network, according to an embodiment of the invention.

As shown in FIG. 3, burst mode network 54 may receive the voltage feedback signal Vfb (when switch 72 in FIG. 2 is closed) and a control signal VCP'. Burst mode network 54 may operate with current-limited function (current control) during the burst mode of operation and feedback voltage control during normal mode of operation. An implementation for burst mode network 54 includes comparators 100, 102, 116, OR gate 106, latch 108, inverter gate 112, current source 122, transistors 128, 130, 132, 134, resistors 136, 140, 142, 144, and reference voltage sources 146, 148.

One portion of the burst mode network 54 supports normal mode of operation for power converter system 10, and another portion of the burst mode network supports burst mode of operation. The portion for normal mode operation receives the VCP' control signal. The comparator 116 outputs a Burst signal which is provided to the PWM network 50 (FIG. 2).

Burst mode network 54 is switchably connectable to the feedback pin for the control module 18 (see FIG. 2). When connected to the feedback pin, comparators 100 and 102 compare the voltage feedback signal Vfb against respective reference voltages generated by voltage sources 146, 148. Essentially, comparators 100 and 102 implement a sensing technique to determine the level of the feedback voltage. Comparator 102 is for changing between normal mode and burst mode. Since changing between modes can be accomplished in response to the feedback voltage signal for every occurrence of burst mode, burst mode network 54 is able to quickly respond for changing modes. Latch 108 may be implemented as a set-reset (SR) flip flop (FF). The output of comparator 102 is provided to one input of the OR gate 106 and also the set (S) input of latch 108. The output of comparator 100 is provided to the reset pin of latch 108, which controls the signal Q_overbar of latch 108. The Q_overbar signal is provided to the other input of the OR gate 106. OR gate 106 performs an OR operation on the input signals and outputs a control signal Bi-b. Inverter gate 112 inverts the output of comparator 102 to provide a control signal Bi.

In burst mode network 54, control signals Bi_b and Bi are generated internally and are provided to the portions of the network 54 for normal and burst mode operation. When the feedback voltage signal Vfb drops below the comparative reference voltage 148 of comparator 102, the inverter gate 112 and the OR gate 106 output values for the Bi and Bi_b signals which cause burst mode network 54 to provide or support burst mode operation of the power converter system 10. According to these values for the control signals, the circuitry in burst mode network 54 for current limited function (current control) is operated. When the feedback voltage signal Vfb drops below the comparative reference voltage 146 of comparator 100, the inverter gate 112 and the OR gate 106 output values for the Bi and Bi_b signals which cause the switching device 16 to stop switching.

As the output voltage (Vout) of the power converter system 10 increases, the feedback voltage Vfb also increases. When the feedback voltage Vfb exceeds the comparative voltage 148 of the comparator 102, the inverter gate 112 and the OR gate 106 output values for the Bi and Bi_b signals which cause the burst mode network 54 to provide or support normal mode operation of the power converter system 10. Burst mode operation is provided at stand-by, and the power converter system 10 returns to the normal mode of operation at the load condition.

Figure 6:
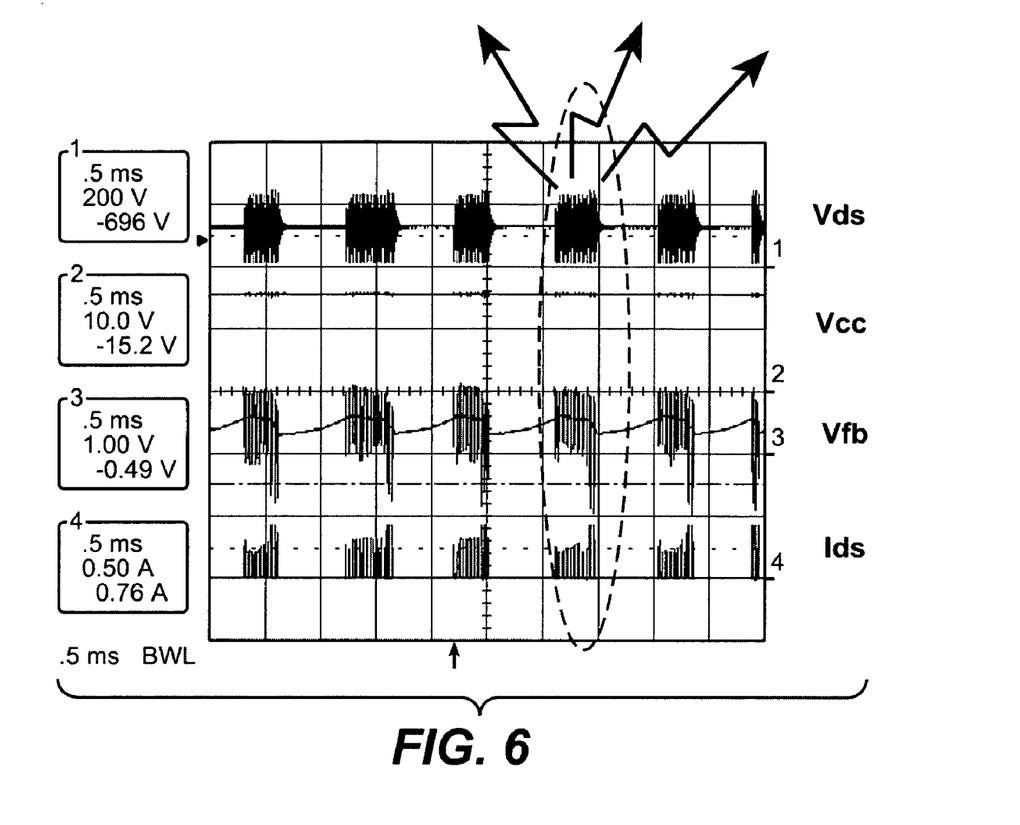
FIG. 6 is an exemplary waveform diagram for burst mode operation.

Referring again to FIGS. 1 and 2, in the burst mode of operation, the control module 18 provides a fixed frequency output signal for intervals of time (i.e., bursts) that are interleaved with intervals of time during which the output of the control module 18 is inactive (i.e., turned off). More specifically, in the burst mode of operation, the burst mode network 54 controls the switching device 16 to turn on and off, switchably connecting the primary winding L1 of transformer 14 to the line voltage in bursts which occur at a low frequency. The burst mode of operation consumes relatively low power and can be used in the standby of an electronic device. FIG. 6 shows exemplary waveforms for burst mode operation, with arrows indicating the noise created or generated by this kind of operation.

Switch 76, current source 78, and diodes 80, 82, 84 function to support the normal mode of operation, along with the PWM network 50. These circuit elements are enabled when the supply voltage Vcc exceeds the UVLO value, which closes switch 76. In the normal mode of operation, the output voltage of the power converter system 10 is fed back (via feedback signal Vfb) to the control module 18 through the feedback network (comprising optocoupler 20 and capacitor 28). Responsive to the feedback, the PWM network 50 of the control module 18 modulates the duty cycle of the fixed-frequency clock signal to regulate the output voltage of the power converter system 10 to a desired level.

Figure 4:
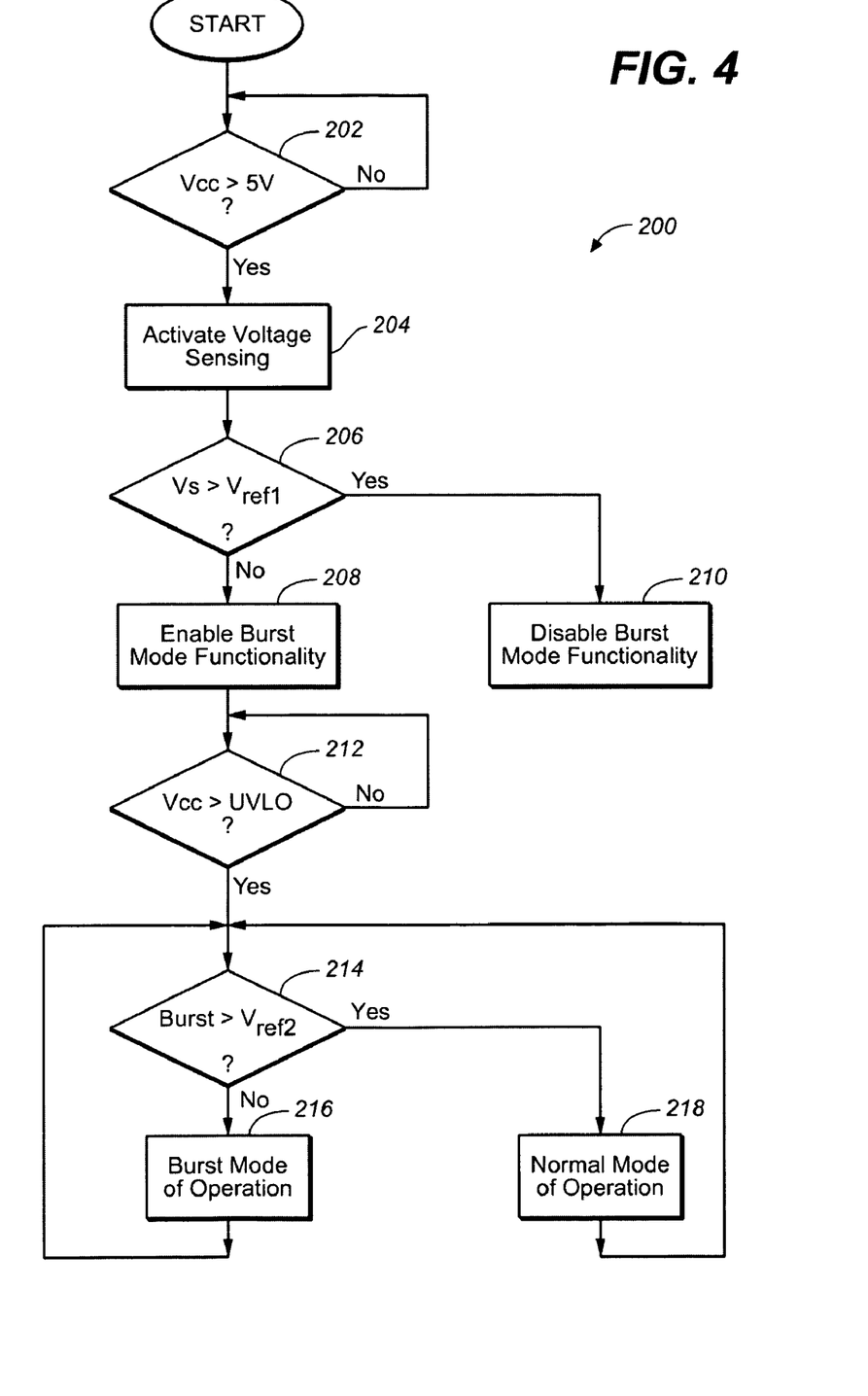
FIG. 4 is a flow diagram of exemplary method for automatically configuring a power converter system to operate with or without burst mode functionality, according to an embodiment of the invention.

FIG. 4 is a flow diagram of exemplary method 200 for automatically configuring a power converter system to operate with or without burst mode functionality, according to an embodiment of the invention. In one embodiment, this method 200 may be performed in or implemented by the power converter system 10 shown and described in FIGS. 1 and 2.

At block 202 in method 200, after the power converter system 10 is first started (e.g., when the electronic device is turned on), system 10 waits for the supply voltage Vcc to exceed a minimal voltage value, such as 5V. This minimal voltage represents or indicates a "power good" level of supply voltage Vcc at which the configuration circuitry can be activated. Once such voltage has been exceeded, switch 70 in the burst mode rejection network 52 is turned on, thereby activating burst mode rejection network 52 for voltage sensing at block 204.

At block 206, comparator 68 in burst mode rejection network 52 compares the voltage of the Vsense signal at the configuration input terminal (e.g., pin 5) against the reference voltage Vref1. If the resistor 30 is present in the power converter system 10 to connect the configuration input terminal to the line voltage (or Vin), then some amount of voltage will appear at the configuration input terminal which is greater than the reference voltage Vref1. Comparator 68 outputs a signal which does not close switch 72. As such, at block 210, burst mode functionality is disabled for power converter system 10. Power converter system 10 operates with the PWM network 50 of control module 18 controlling and driving the switching device 16 to provide power at output terminal Vout.

Alternately, if the resistor 30 is absent from the power converter system 10, the magnitude of the Vsense voltage at the configuration input terminal will be less than the reference voltage Vref1, and comparator 68 outputs a signal which closes switch 72. At block 208 then, burst mode functionality is enabled for power converter system 10.

At block 212, power converter system 10 waits for the supply voltage Vcc to exceed the undervoltage lockout (UVLO) value which, for example, can be 12V. The UVLO value represents or indicates a "power good" level of supply voltage Vcc for the active operation of the power converter system 10. Once the supply voltage Vcc exceeds the UVLO value, switch 76 closes. This allows the power converter system 10 to alternatingly operate between the normal mode and the burst mode of operation.

At block 214, PWM comparator 56 in the PWM network 50 compares the Burst signal against the reference voltage Vref2 received from the switching device 16. If the Burst signal is less than the reference voltage Vref2, then at block 216 power converter system 10 operates in the burst mode of operation, as supported by burst mode network 54. In the burst mode of operation, the control module 18 provides a fixed frequency output signal to switching device 16 for intervals of time (i.e., bursts) that are interleaved with intervals of time during which the output of the control module 18 is inactive (i.e., turned off).

Alternately, if the Burst signal is greater than the reference voltage Vref2, then at block 218 power converter system 10 operates in the normal mode of operation. In the normal mode of operation, the PWM network 50 of control module 18 modulates the duty cycle of the fixed-frequency clock signal to regulate the output voltage Vout of the power converter system 10 to a desired level.

Method 200 may continue with power converter system 10 alternating between the normal mode of operation and the burst mode of operation until the electronic device in which power converter system 10 is incorporated or used is turned off.

Figure 5:
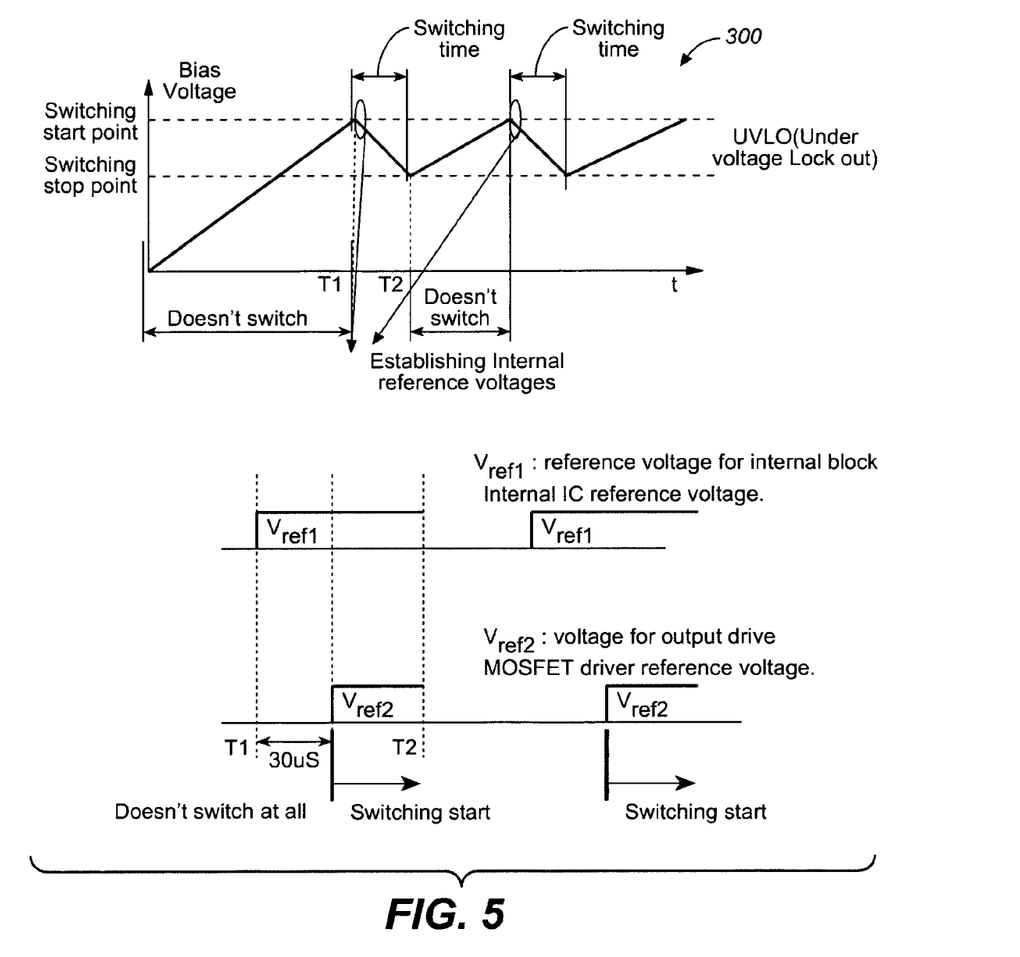
FIG. 5 is a waveform diagram illustrating an exemplary operation of the power converter system, according to an embodiment of the present invention.

FIG. 5 is a waveform diagram 300 illustrating an exemplary operation of the power converter system 10, according to an embodiment of the present invention. Diagram 300 shows how and when the first reference voltage (Vref1) and the second reference voltage (Vref2) are turned on and the role of each of these reference voltages in operation.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A method for a power converter system capable of use in either a portable electronic device or a non-portable electronic device, the method comprising:
   automatically configuring the power converter system to operate with burst mode functionality if a control module of the power converter system is coupled in a first arrangement for a portable electronic device; and
   automatically configuring the power converter system to operate without burst mode functionality if the control module of the power converter system is coupled in a second arrangement for a non-portable electronic device;

wherein if the power converter system is configured to operate with burst mode functionality, the power converter system can alternatingly operate in burst mode or normal mode;

wherein if the power converter system is configured to operate without burst mode functionality, the power converter system cannot operate in burst mode.

2. The method of claim 1 wherein automatically configuring is performed by the control module.

3. The method of claim 1 wherein the control module is implemented in an integrated circuit device.

4. The method of claim 1 wherein in the first arrangement a configuration terminal of the control module is coupled to a line voltage for the power converter system, and wherein in the second arrangement the configuration terminal of the control module is not coupled to the line voltage for the power converter system.

5. The method of claim 4 wherein automatically configuring comprises comparing a voltage at the configuration terminal against at least one reference voltage.

6. The method of claim 1 comprising connecting the control module in either the first arrangement or the second arrangement.

7. The method of claim 1 wherein automatically configuring occurs when the power converter system experiences an undervoltage lockout (UVLO) condition.

8. A control module for automatically configuring a power converter system to operate with burst mode functionality in a portable electronic device or without burst mode functionality in a non-portable electronic device, the control module comprising:
   a configuration terminal; and
   circuitry for automatically configuring the power converter system to operate with burst mode functionality if the configuration terminal is coupled in a first arrangement in the power converter system for a portable electronic device and for automatically configuring the power converter system to operate without burst mode functionality if the configuration terminal is coupled in a second arrangement in the power converter system for a non-portable electronic device;
   wherein if the power converter system is configured to operate with burst mode functionality, the power converter system can alternatingly operate in burst mode or normal mode;
   wherein if the power converter system is configured to operate without burst mode functionality, the power converter system cannot operate in burst mode.

9. The control module of claim 8 wherein the control module is implemented in an integrated circuit device.

10. The control module of claim 8 wherein the circuitry for automatically configuring comprises a burst mode rejection network coupled to the configuration terminal, the burst mode rejection network operable to compare a voltage at the configuration terminal against at least one reference voltage.

11. The control module of claim 8 wherein in the first arrangement the configuration terminal of the control module is connected to a line voltage for the power converter system, and wherein in the second arrangement the configuration terminal of the control module is not connected to the line voltage for the power converter system.

12. A power converter system capable of use in either a portable electronic device or a non-portable electronic device, the system comprising:
   an input terminal for receiving an AC input voltage;
   a rectifier coupled to the input terminal for rectifying the AC input voltage to provide a DC line voltage;
   a transformer coupled to the rectifier, the transformer having a primary winding and a secondary winding;
   a switching device coupled to the primary winding of the transformer and operable to be turned on and off to cause current to flow through the primary winding;
   an output terminal coupled to secondary winding of the transformer at which power is delivered to a load of the power converter system; and
   a control module coupled to the switching device for controlling the switching device, the control module operable to automatically configure the power converter system to operate with burst mode functionality if the control module is connected in a first arrangement in the power converter system for a portable electronic device, the control module further operable to automatically configure the power converter system to operate without burst mode functionality if the control module is connected in a second arrangement in the power converter system for a non-portable electronic device;
   wherein if the power converter system is configured to operate with burst mode functionality, the power converter system can alternatingly operate in burst mode or normal mode;
   wherein if the power converter system is configured to operate without burst mode functionality, the power converter system cannot operate in burst mode.

13. The power converter system of claim 12 wherein the control module and the switching device are implemented in an integrated circuit device.

14. The power converter system of claim 12 wherein the control module comprises:
   a configuration terminal; and
   a burst mode rejection network coupled to the configuration terminal, the burst mode rejection network operable to compare a voltage at the configuration terminal against at least one reference voltage.

15. The power converter system of claim 12 wherein in the first arrangement a configuration terminal of the control module is coupled to the DC line voltage for the power converter system, and wherein in the second arrangement the configuration terminal of the control module is not coupled to the DC line voltage for the power converter system.

16. The power converter system of claim 12 wherein the switching device comprises a senseFET.

* * * * *